United States Patent
Hsieh et al.

(10) Patent No.: US 8,286,020 B2
(45) Date of Patent: Oct. 9, 2012

(54) POWER SUPPLY AND PROTECTION METHOD THEREOF

(75) Inventors: Ping-Cheng Hsieh, Taoyuan (TW);
Jui-Hsiu Lin, Taoyuan (TW);
Hao-Chieh Liu, Taoyuan (TW);
Cheng-Tuan Lu, Taoyuan (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 293 days.

(21) Appl. No.: 12/848,194

(22) Filed: Aug. 1, 2010

(65) Prior Publication Data

US 2011/0219255 A1 Sep. 8, 2011

(30) Foreign Application Priority Data

Mar. 5, 2010 (TW) ................................ 99106420 U

(51) Int. Cl.
*G06F 1/28* (2006.01)
*G06F 1/30* (2006.01)

(52) U.S. Cl. .................... 713/340; 713/300; 713/330
(58) Field of Classification Search ................... 713/340
See application file for complete search history.

(56) References Cited

U.S. PATENT DOCUMENTS

| | | | | |
|---|---|---|---|---|
| 5,563,782 | A * | 10/1996 | Chen et al. | 363/146 |
| 5,900,684 | A * | 5/1999 | Lam | 307/139 |
| 6,005,789 | A * | 12/1999 | Lee | 363/95 |
| 6,172,891 | B1 * | 1/2001 | O'Neal et al. | 363/146 |
| 6,894,457 | B2 * | 5/2005 | Germagian et al. | 320/119 |
| 7,224,086 | B2 * | 5/2007 | Germagian et al. | 307/128 |
| 7,421,605 | B2 * | 9/2008 | Balasubramanian et al. | 713/340 |
| 7,436,687 | B2 * | 10/2008 | Patel | 363/142 |
| 7,462,073 | B2 * | 12/2008 | Bell et al. | 439/639 |
| 7,492,183 | B2 * | 2/2009 | Balasubramanian et al. | 326/37 |
| 7,493,506 | B2 * | 2/2009 | Balasubramanian et al. | 713/330 |
| 7,836,322 | B2 * | 11/2010 | Chapuis et al. | 713/340 |
| 8,140,879 | B2 * | 3/2012 | Chueh et al. | 713/340 |
| 2004/0130213 | A1 * | 7/2004 | Goldsholl | 307/11 |
| 2004/0199800 | A1 * | 10/2004 | Yu et al. | 713/320 |
| 2005/0063113 | A1 * | 3/2005 | Ogawa | 361/57 |
| 2007/0096692 | A1 * | 5/2007 | Chuang et al. | 320/128 |
| 2009/0128186 | A1 * | 5/2009 | Balasubramanian et al. | 326/38 |
| 2010/0250973 | A1 * | 9/2010 | Breen et al. | 713/300 |
| 2012/0151240 | A1 * | 6/2012 | Robinson et al. | 713/340 |
| 2012/0179929 | A1 * | 7/2012 | Chen et al. | 713/330 |

* cited by examiner

Primary Examiner — Ryan Stiglic
(74) *Attorney, Agent, or Firm* — Altis Law Group, Inc.

(57) ABSTRACT

A power supply includes a power supply module, a microcontroller, a setting unit, a number of switch units, a number of current detection units, and a number of output connectors. Each switch unit is connected to one output connector via one current detection unit. The power supply module converts an alternating current (AC) voltage into a direct current (DC) to power electronic devices connected to each output connector by the corresponding switch unit, and the corresponding current detection unit. Each current detection unit detects a current passing through the output connector. The microcontroller calculates a total power of the power supply module according the detected currents and the DC voltage, and turns off all the switch units when the total power is greater than a predetermined current according to a protection mode set in the setting unit.

9 Claims, 6 Drawing Sheets

POWER SUPPLY AND PROTECTION METHOD THEREOF

BACKGROUND

1. Technical Field

The present disclosure relates to a power supply and a protection method thereof.

2. Description of Related Art

A notebook computer is typically powered by an internal rechargeable battery that is charged using an external power supply. The external power supply connecting a socket of an AC power can charge the battery and power the notebook computer simultaneously. When the battery is fully charged, the notebook computer continues to run on the AC power. Sometimes, such as in a meeting, a number of notebook computers may need external power supplies due to the limited capacities of the batteries attached thereto. However, a number of outlets are required in the meeting, which requirement is not always satisfied.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation. It should be noted that references to "an" or "one" embodiment in this disclosure are not necessarily to the same embodiment, and such references may mean at least one.

Figure 1:
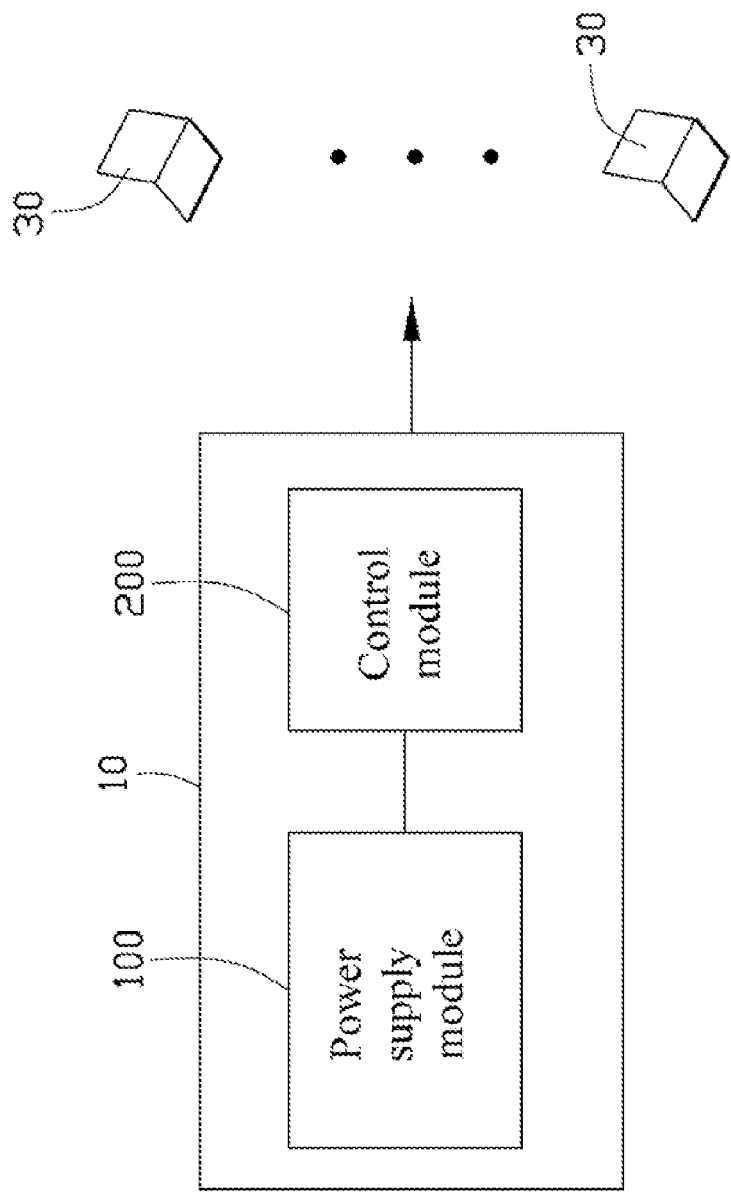
FIG. 1 is a schematic view of a power supply powering a plurality of electronic devices.
Figure 2:
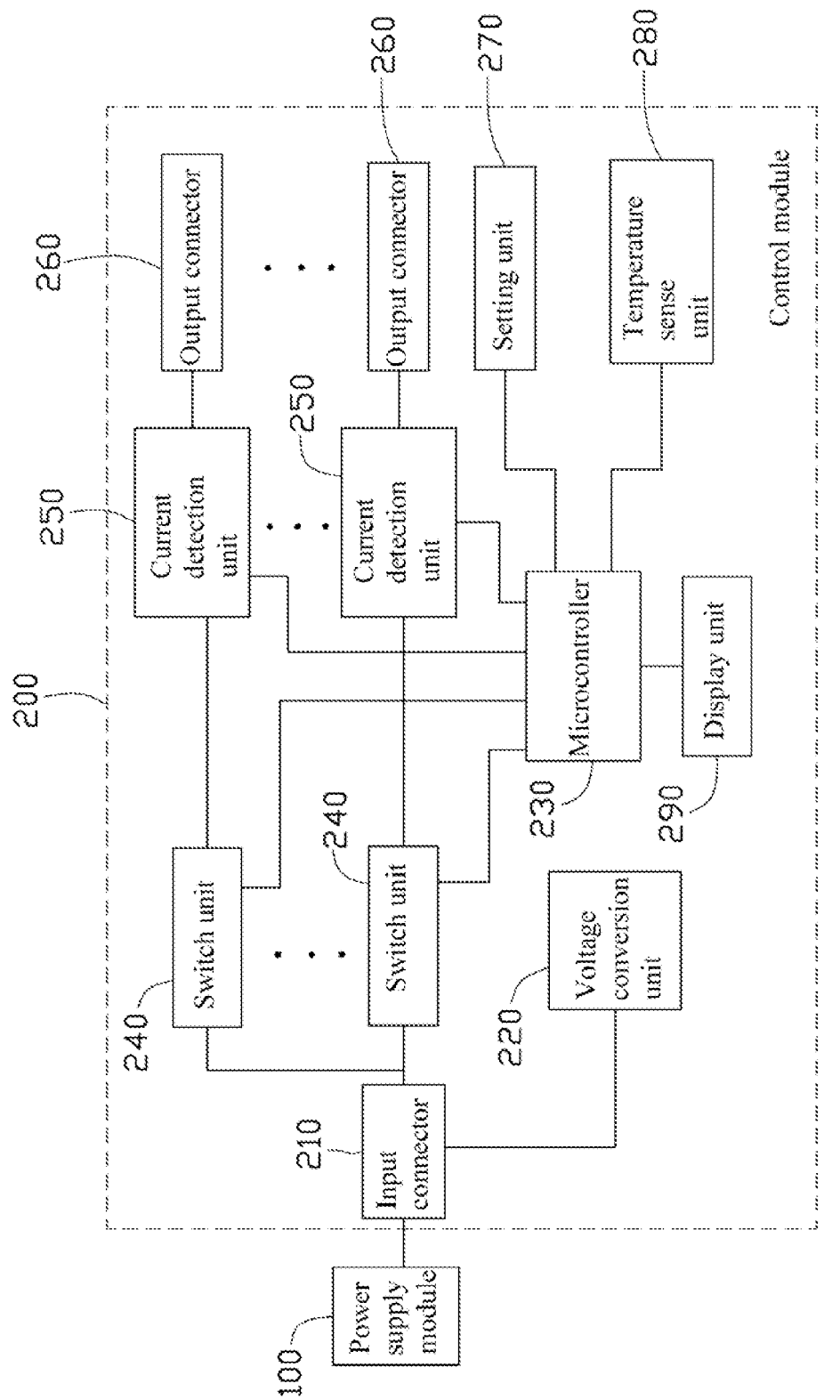
FIG. 2 is a block diagram of an exemplary embodiment of a power supply.

Referring to FIGS. 1 and 2, an exemplary embodiment of a power supply 10 includes a power supply module 100, and a control module 200. The control module 200 includes an input connector 210, a voltage conversion unit 220, a microcontroller 23, a plurality of switch units 240, a plurality of current detection units 250, a plurality of output connectors 260, a setting unit 270, a temperature sensing unit 280, and a display unit 290. The input connector 210 is connected to the power supply module 100, the voltage conversion unit 220, and the plurality of switch units 240. Each switch unit 240 is connected to one output connector 260 via one current detection unit 250. The output connectors 260 are used to respectively connect to a plurality of electronic devices 30 such as notebook computers each with a battery attached thereto to power the electronic devices 30. In the embodiment, one switch unit 240 corresponds to one current detection unit 250 and one output connector 260, that is, the number of the switch units 240 is equal to the number of the current detection units 250, and equal to the number of the output connectors 260. In the other embodiments, the number of the switch units 240, the current detection units 250, and the output connectors 260 can be adjusted according to need.

The power supply module 100 is used to convert an alternating current (AC) voltage into a direct current (DC) voltage. The DC voltage is transmitted to the voltage conversion unit 220 and the switch units 240 by the input connector 210.

The voltage conversion unit 220 converts the DC voltage into an appropriate voltage to power the microcontroller 230, the switch units 240, the current detection units 250, the setting unit 270, the temperature sensing unit 280, and the display unit 290.

Each current detection unit 250 is used to detect a current passing through each of the output connectors 260, and output the current to the microcontroller 230. The microcontroller 230 is used to compare the current with a first predetermined current and a second predetermined current. If the current is less than the first predetermined current, it indicates the electronic device 30 is in a low-load state. If the current of the electronic device 30 is greater than the second predetermined current, it indicates the electronic device 30 is in an over-current state. The microcontroller 230 determines whether the number of occurrences of the over-current of the electronic device 30 in a specified time period is more than predetermined times. If the number of occurrences are not more than the predetermined times, the current detection unit 250 continues to detect the current passing through the output connector 260. If the number of occurrences is more than the predetermined times, the microcontroller 230 turns off the switch unit 240 connecting to the corresponding electronic device 30.

The setting unit 270 is used to provide a setting interface for a user to set a protection mode for the power supply 10, and output the set protection mode to the microcontroller 230. The protection mode includes an alternative power mode and a limitation output mode. Two buttons (not shown) respectively corresponding to the alternative power mode and the limitation output mode are mounted to the power supply 10 to allow the user to set the protection mode. In the alternative power mode, if the electronic device 30 is not powered by the power supply module 100, the battery attached thereto will power the electronic device 30. In the limitation output mode, the microcontroller 230 is used to turn off the switch units 240 connected to the output connector 260 which are not connected to any electronic device 30.

The microcontroller 230 is used to calculate the total power of the power supply module 100 according to the current passing through the current detection units 250 and a DC voltage output from the power supply module 100, and compare the total power with a first predetermined power and a second predetermined power. In the embodiment, the first predetermined power is a power rating of the power supply module 100. The second predetermined power is equal to the power rating of the power supply module 100 subtracting a power rating of the electronic device 30. In this embodiment, the types of electronic devices 30 are the same. If the total power is greater than the first predetermined power, it indicates the power supply module 100 is in an over-load state and the microcontroller 230 is used to turn off all the switch units 240. If the total power is not greater than the first predetermined power, the microcontroller 230 is used to determine whether the total power is greater than the second predetermined power. If the total power is not greater than the second predetermined power, the current detection unit 250 continues to detect the current passing through the output connector 260. If the total power is greater than the second predetermined power, the microcontroller 230 is used to determine whether the protection mode is in the alternative power mode. If the protection mode is in the alternative power mode, the microcontroller 230 is used to detect the low-load electronic devices 30 and control the switch units 240 corresponding to the low-load electronic devices 30 to be alternatively turned off. Thus, the low-load electronic devices 30 which are turned off are powered by the battery attached thereto.

The display unit 290 is used to display the setting interface, a total power output from the power supply 10, and a power state of each of the electronic devices 30.

The microcontroller 230 is used to determine whether the protection mode is set. If the protection mode is not set, the microcontroller 230 is used to control the display unit 290 to display the setting interface for the user to set the protection mode. If the protection mode is set, the microcontroller 230 is used to turn on the switch units 240 according to the protection mode set.

The temperature sensing unit 280 is used to sense temperatures of the voltage conversion unit 220, the microcontroller 230, the switch units 240, and the current detection unit 250, and output temperatures to the microcontroller 230. The microcontroller 230 is used to determine whether each of the temperatures is greater than a predetermined temperature. If any one of the temperatures is not greater than the predetermined temperature, the temperature sensing unit 280 continues to sense the temperatures of the voltage conversion unit 220, the microcontroller 230, the switch units 240, and the current detection unit 250. If one of the temperatures is greater than the predetermined temperature, the microcontroller 230 turns off all the switch units 240.

Referring to FIGS. 3A-3B, 4 and 5, an exemplary embodiment of a power supply protection method includes a power protection method, a current protection method, and a temperature protection method. In the embodiment, the power protection method, the current protection method, and the temperature protection method are all adopted to protect the power supply 10. In another embodiment, the power protection method, the current protection method, and the temperature protection method can be selectively adopted to protect the power supply 10 according to need.

Figure 3A:
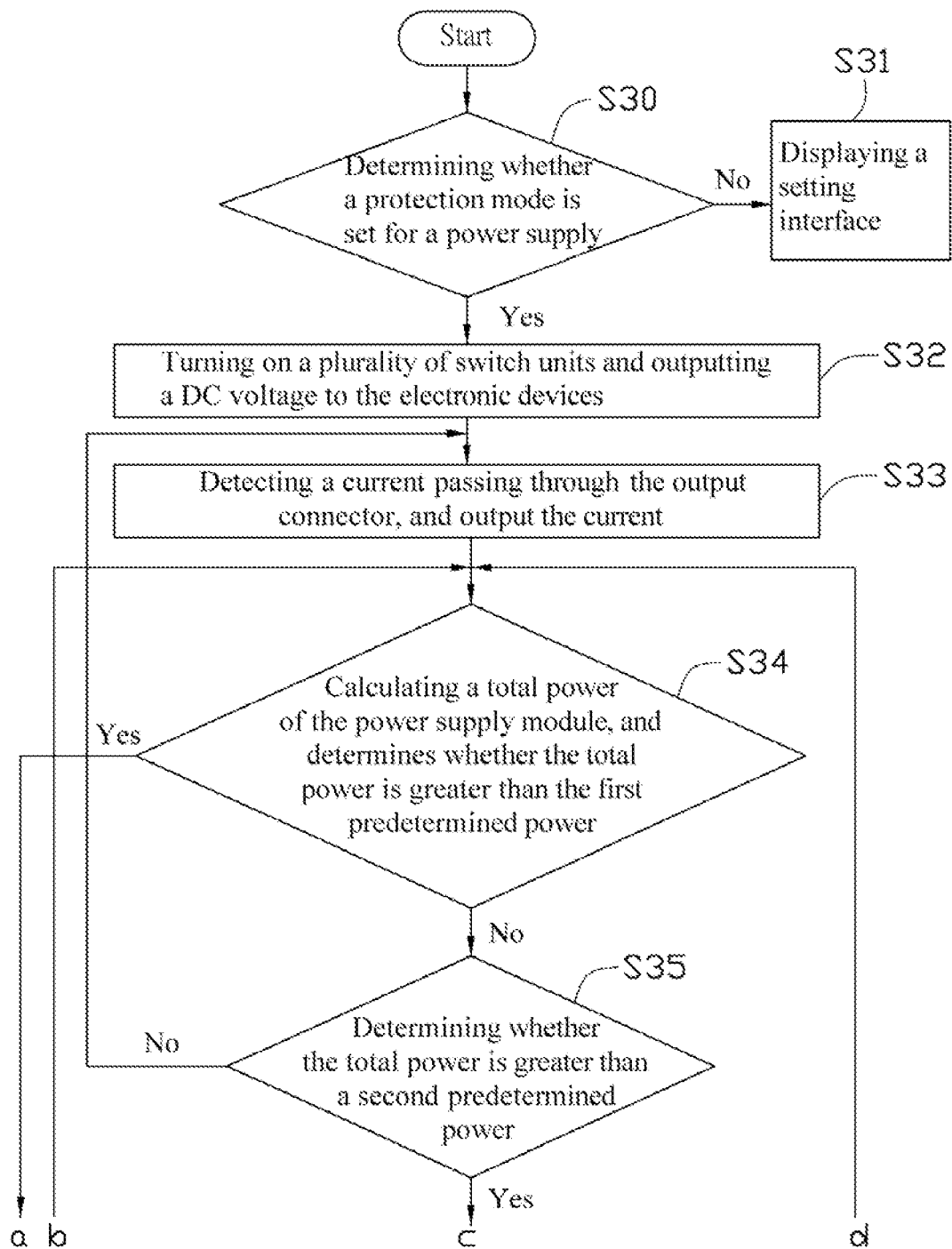
FIGS. 3A-3B are a flowchart of an embodiment of a power protection method of the power supply of FIG. 1.
Figure 3B:
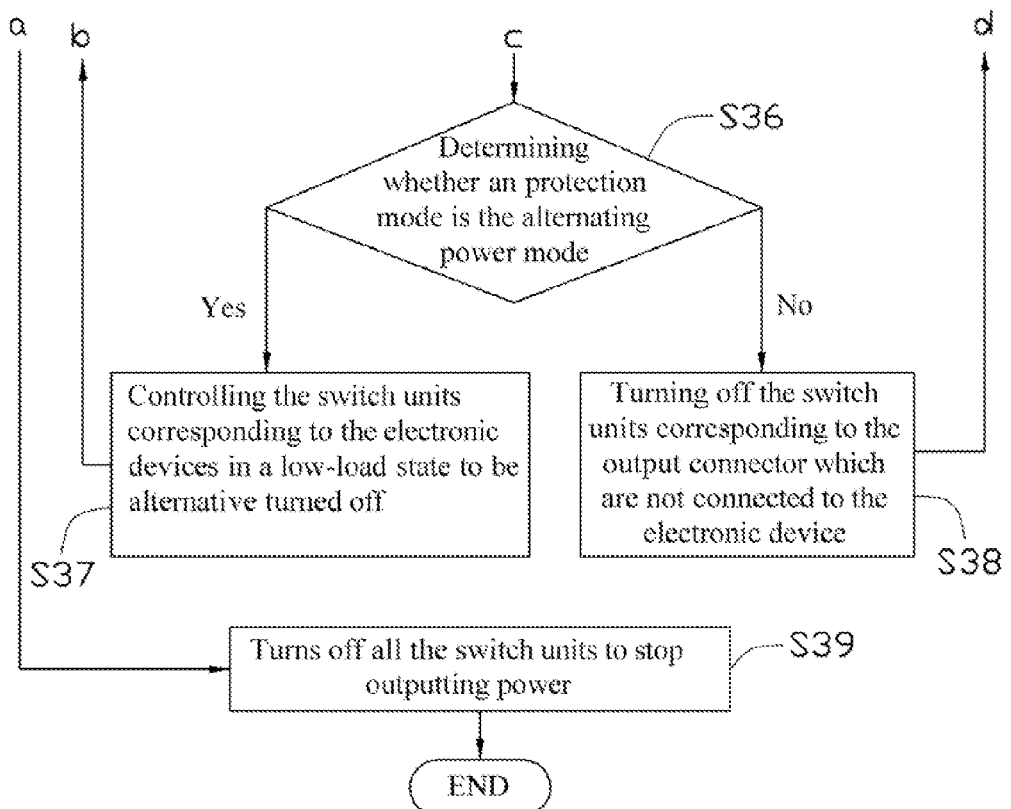

Referring to FIG. 3A-3B, the power protection method includes following steps.

In step 30, the microcontroller 230 determines whether the protection mode is set for the power supply 10. If the protection mode is not set, the procedure goes to step 31; if the protection mode is set, the procedure goes to step 32.

In step 31, the microcontroller 230 controls the display unit 290 to display the setting interface, the procedure goes back to step S30.

In step 32, the microcontroller 230 turns on the switch units 240. The power supply module 100 outputs a DC voltage to the switch units 240, the voltage conversion unit 220 via the input connector 210.

In step 33, each current detection unit 250 detects a current passing through the output connector 260, and outputs the current to the microcontroller 230.

In step 34, the microcontroller 230 calculates a total power of the power supply module 100 according the current passing through the current detection units 250 and the DC voltage output therefrom, and compares the total power with the first predetermined power. If the total power is not greater than the first predetermined power, the procedure goes to step 35. If the total power is greater than the first predetermined power, the procedure goes to step 39.

In step 35, the microcontroller 230 determines whether the total power is greater than the second predetermined power. If the total power is not greater than the second predetermined power, the procedure goes back to step 33. If the total power is greater than the second predetermined power, the procedure goes to step 36.

In step 36, the microcontroller 230 determines whether the protection mode is the alternative power mode. If the protection mode is in the alternative power mode, the procedure goes to step 37. If the protection mode is the limitation output mode, the procedure goes to step 38.

In step 37, the microcontroller 230 detects the electronic devices 30 which are in a low-load state and controls the corresponding switch units 240 to be turned off and the low-load electronic devices 30 which are turned off are powered by the battery attached thereto, the procedure goes back to step 34.

In step 38, the microcontroller 230 turns off the switch unit 240 corresponding to the output connector 260 which is not connected to the electronic device 30, the procedure goes back to step 34.

In step 39, it indicates the power supply module 100 is in the over-load state and the microcontroller 230 turns off all the switch units 240.

Figure 4:
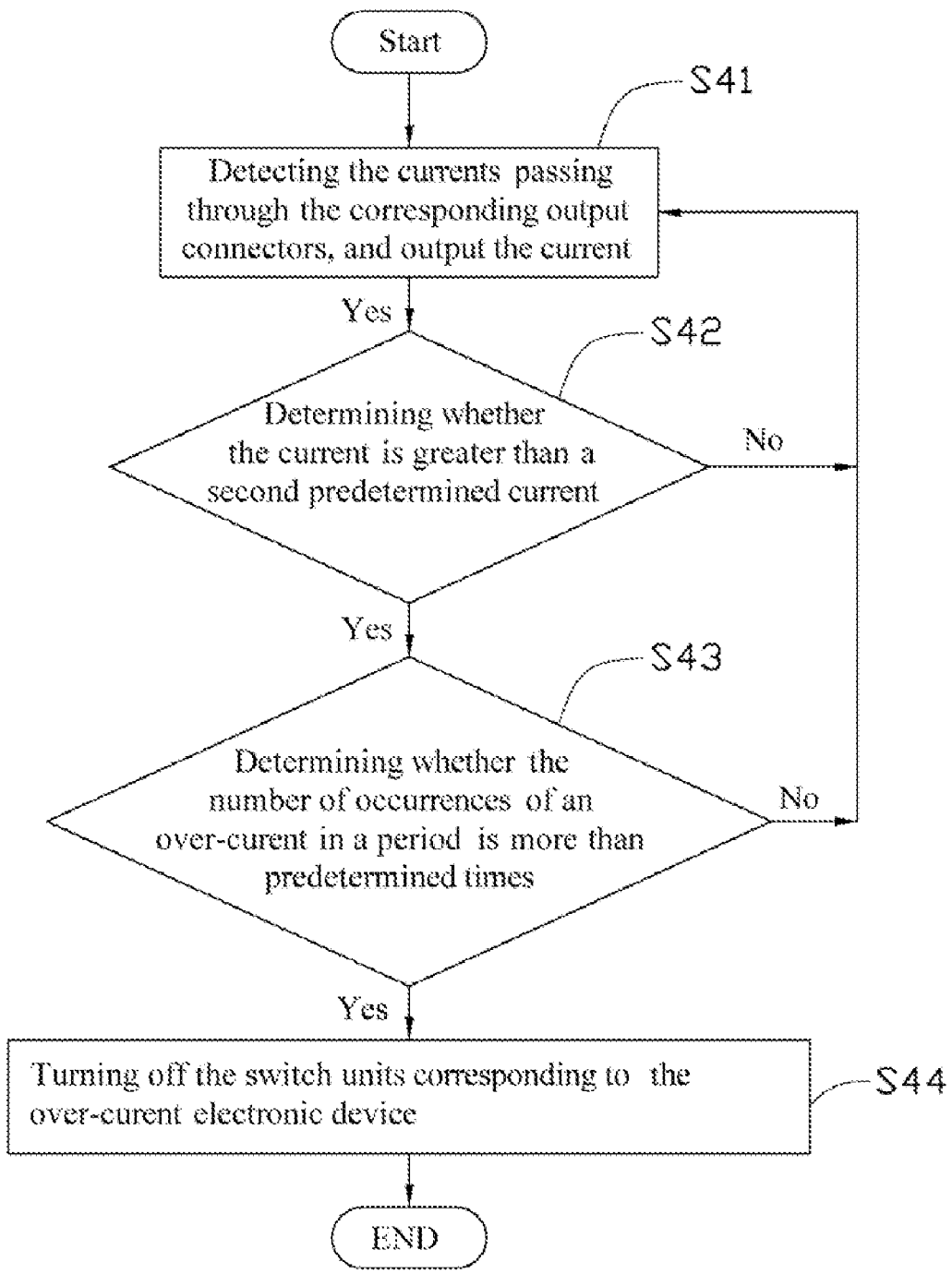
FIG. 4 is a flowchart of an embodiment of a current protection method of the power supply of FIG. 1.

Referring to FIG. 4, the current protection method is used to prevent the power supply module 100 from damaging due to over-current. The current protection method includes the following steps.

In step 41, each current detection unit 250 detects the current passing through the output connector 260, and outputs the current to the microcontroller 230.

In step 42, the microcontroller 230 compares the current with the second predetermined current. If the current is not greater than the second predetermined current, the procedure goes back to step 41; if the current is greater than the second predetermined current, that is, the electronic device 30 is in the over-current state, the procedure goes to step 43.

In step 43, the microcontroller 230 determines whether number of occurrences of the over-current in a specified time period is more than the predetermined times. If the number of occurrences is not more than the predetermined times, the procedure goes back to step 41. If the number of occurrences is more than the predetermined times, the procedure goes to step 44.

In step 44, the microcontroller 230 turns off the switch unit 240 corresponding to the over-current electronic device 30.

Figure 5:
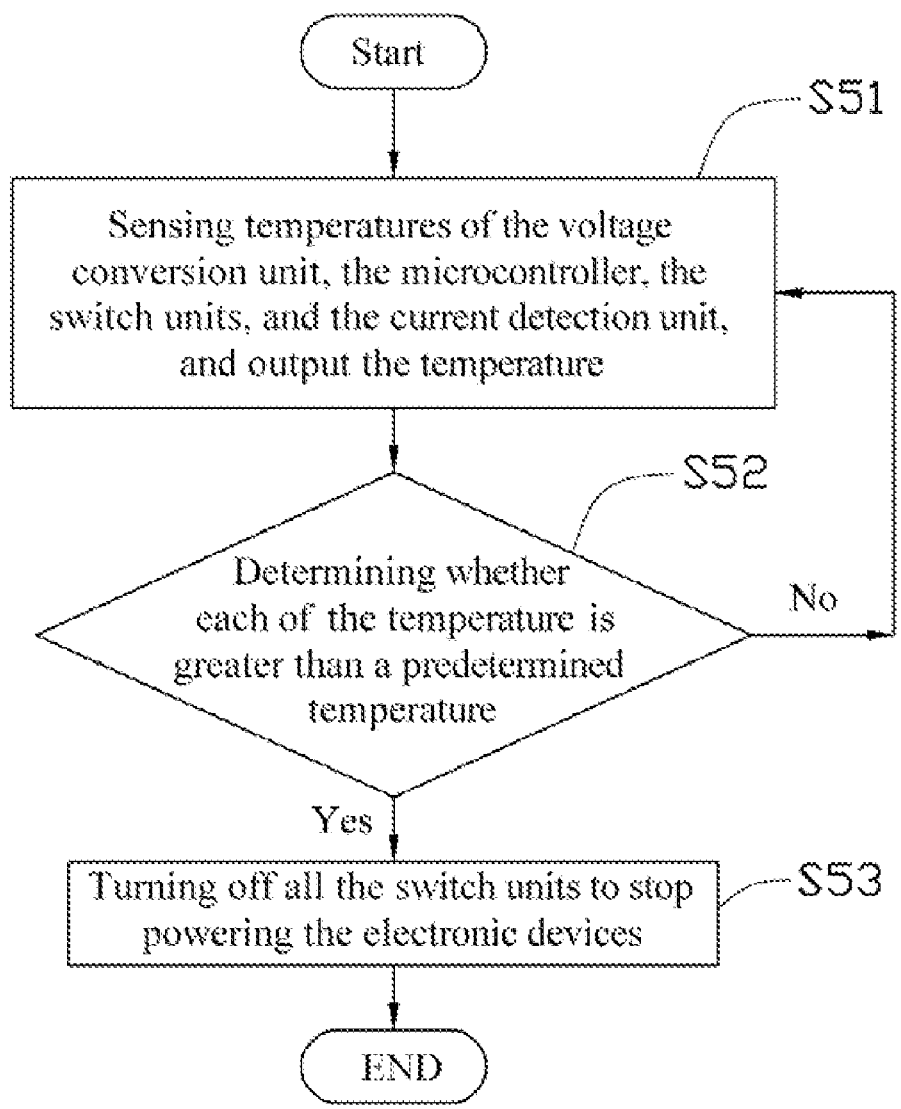
FIG. 5 is a flowchart of an embodiment of a temperature protection method of the power supply of FIG. 1.

Referring FIG. 5, the temperature protection method is used to prevent the electronic device 30 from damage due to high temperature. The temperature method includes the following steps.

In step 51, the temperature sensing unit 280 senses the temperatures of the voltage conversion unit 220, the microcontroller 230, the switch units 240, and the current detection units 250, and outputs the temperatures to the microcontroller 230.

In step 52, the microcontroller 230 determines whether each of the temperatures is greater than a predetermined temperature. If any one temperature is not greater than the predetermined temperature, the procedure goes back to step 51; if one of the temperatures is greater than the predetermined temperature, the procedure goes to step 53.

In step 53, the microcontroller 230 turns off all the switch units 240 to stop powering the electronic devices 30.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply comprising:
   a plurality of switch units;
   a plurality of output connectors to be respectively connected to a plurality of electronic devices;
   a plurality of current detection unit, each current detection unit connected between one of the switch units and one of the output connectors;
   a power supply module to convert an alternating current (AC) voltage into a direct current (DC) voltage to power the electronic devices via the switch units, the current detection unit, and the output connectors, wherein the current detection units are respectively used to detect currents passing through the output connectors respectively connected to the electronic devices and output the currents;
   a microcontroller connected to the switch units and the current detection units to receive the currents and calculate a total power of the power supply module according the currents and the DC voltage, wherein when the total power of the power supply module is greater than a first predetermined power, the microcontroller is used to turn off all the switch units; and
   a setting unit to set a protection mode, wherein when the total power of the power supply module is less than the first predetermined power and greater than a second predetermined power, the microcontroller alternatively powers the electronic devices which are in a low-load state or turns off the switch unit corresponding to the output connector which is not connected to an electronic device.

2. The power supply of claim 1, wherein the first predetermined power is a power rating of the power supply module, the second predetermined power is equal to the power rating of the power supply module subtracting a power rating of the electronic device.

3. The power supply of claim 1, wherein the microcontroller is further to determine whether the current passing through the output connector is greater than a predetermined current, if the current is greater than the predetermined current, it indicates the electronic device connecting to the output connector is in an over-current state, the microcontroller is further to determine whether number of occurrences of the over-current of the electronic device in a specified time period is more than predetermined times, if the number of occurrences is more than the predetermined times, the microcontroller is to turn off the switch unit connecting to the corresponding electronic device.

4. The power supply of claim 1, further comprising a temperature sensing unit to sense temperatures of the microcontroller, the plurality of switch units, and the plurality of current detection units, and output the sensed temperatures to the microcontroller, the microcontroller is used to determine whether each of the sensed temperatures are greater than a temperature, if one of the temperatures is greater than the predetermined temperature, the microcontroller turns off all the switch units.

5. The power supply of claim 1, further comprising a display unit, the display unit is used to display the protection mode and a power state of the electronic device.

6. A power supply protection method comprising:
   setting a protection mode for a power supply connected to a plurality of electronic devices;
   powering the plurality of electronic devices connected, and detecting a current of each electronic device and outputting the detected current;
   calculating a total power according the detected current and a voltage output from the power supply, and determining whether the total power is greater than a first predetermined power;
   turning off all the switch units to stop powering the electronic devices if the total power is greater than the first predetermined power;
   determining whether the total power is greater than a second predetermined power if the total power is not greater than the first predetermined power;
   alternatively powering the electronic devices in a low-load state if the total power is greater than the second predetermined power and the protection mode is an alternative power mode; and
   turning off the switch units corresponding to the output connector which is not connected to an electronic device if the total power is greater than the first predetermined power and the protection mode is a limitation output mode.

7. The power supply protection method of claim 6, wherein the first predetermined power is a power rating of the power supply module, the second predetermined power is equal to the power rating of the power supply module subtracting a power rating of the electronic device.

8. The power supply protection method of claim 6, further comprising:
   determining whether the detected current is greater than a predetermined current, if the detected current is greater than the predetermined current, the electronic device is in an over-current state;
   determining whether number of occurrences of the over-current of the electronic device in a period is more than predetermined times; and
   turning off the switch unit corresponding to the corresponding electronic device if the number of occurrences of the over-current is more than the predetermined times.

9. The power supply protection method of claim 6, further comprising:
   sensing temperatures of a microcontroller, a plurality of current detection units, and a plurality of switch units which are received the power supply, and output the temperatures;
   determining whether each of the sensed temperatures is greater than a predetermined temperature; and
   turning off all the switch units if one of the temperatures is greater than the predetermined temperature.

* * * * *